(12) United States Patent
Arai et al.

(10) Patent No.: US 9,230,376 B2
(45) Date of Patent: Jan. 5, 2016

(54) IMAGE FORMING APPARATUS, IMAGE FORMING SYSTEM, AND COMPUTER PROGRAM PRODUCT

(71) Applicants: Mami Arai, Tokyo, PA (US); Minako Sakurai, Kanagawa (JP)

(72) Inventors: Mami Arai, Tokyo, PA (US); Minako Sakurai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/504,764

(22) Filed: Oct. 2, 2014

(65) Prior Publication Data

US 2015/0098100 A1 Apr. 9, 2015

(30) Foreign Application Priority Data

Oct. 8, 2013 (JP) ................. 2013-211436
Aug. 25, 2014 (JP) ................. 2014-170917

(51) Int. Cl.
*H04N 1/00* (2006.01)
*G06K 15/02* (2006.01)
*G06F 3/12* (2006.01)
*G07C 9/00* (2006.01)
*H04M 11/02* (2006.01)

(52) U.S. Cl.
CPC ........... *G07C 9/00103* (2013.01); *H04M 11/02* (2013.01); *H04N 1/00244* (2013.01); *H04N 1/00251* (2013.01); *H04N 1/00334* (2013.01); *G07C 2209/41* (2013.01); *H04N 2201/0082* (2013.01); *H04N 2201/0084* (2013.01)

(58) Field of Classification Search
None
See application file for complete search history.

(56) References Cited

U.S. PATENT DOCUMENTS

| | | | |
|---|---|---|---|
| 8,844,811 B1* | 9/2014 | Rogers et al. | 235/382 |
| 2002/0139845 A1* | 10/2002 | Terada et al. | 235/382 |
| 2004/0099731 A1* | 5/2004 | Olenick et al. | 235/380 |
| 2004/0114779 A1* | 6/2004 | Blazey | 382/100 |
| 2005/0076013 A1* | 4/2005 | Hilbert et al. | 707/3 |
| 2007/0136154 A1* | 6/2007 | Chung | 705/29 |
| 2010/0165389 A1* | 7/2010 | Kido et al. | 358/1.15 |
| 2011/0248818 A1* | 10/2011 | Hashim-Waris | 340/5.52 |
| 2012/0310852 A1* | 12/2012 | Ramalingamoorthy et al. | 705/323 |
| 2013/0214041 A1* | 8/2013 | Wright | 235/378 |

FOREIGN PATENT DOCUMENTS

| | | | | |
|---|---|---|---|---|
| JP | 2000-059554 | | 2/2000 | |
| JP | 2008-171350 | * | 7/2008 | ............ G08B 25/04 |
| JP | 4843508 | | 12/2011 | |

* cited by examiner

*Primary Examiner* — Beniyam Menberu
(74) *Attorney, Agent, or Firm* — Oblon, McClelland, Maier & Neustadt, L.L.P.

(57) ABSTRACT

An image forming apparatus includes: an acquisition unit that acquires visitor information regarding a visitor and notification destination information indicating a destination of notification to a visitor-receiving person who is to receive the visitor; an issuance unit that, based on the visitor information acquired by the acquisition unit, issues a permit indicating that the visitor is allowed to enter; and a notification unit that notifies the destination of notification indicated by the notification destination information acquired by the acquisition unit that the visitor has arrived.

11 Claims, 13 Drawing Sheets

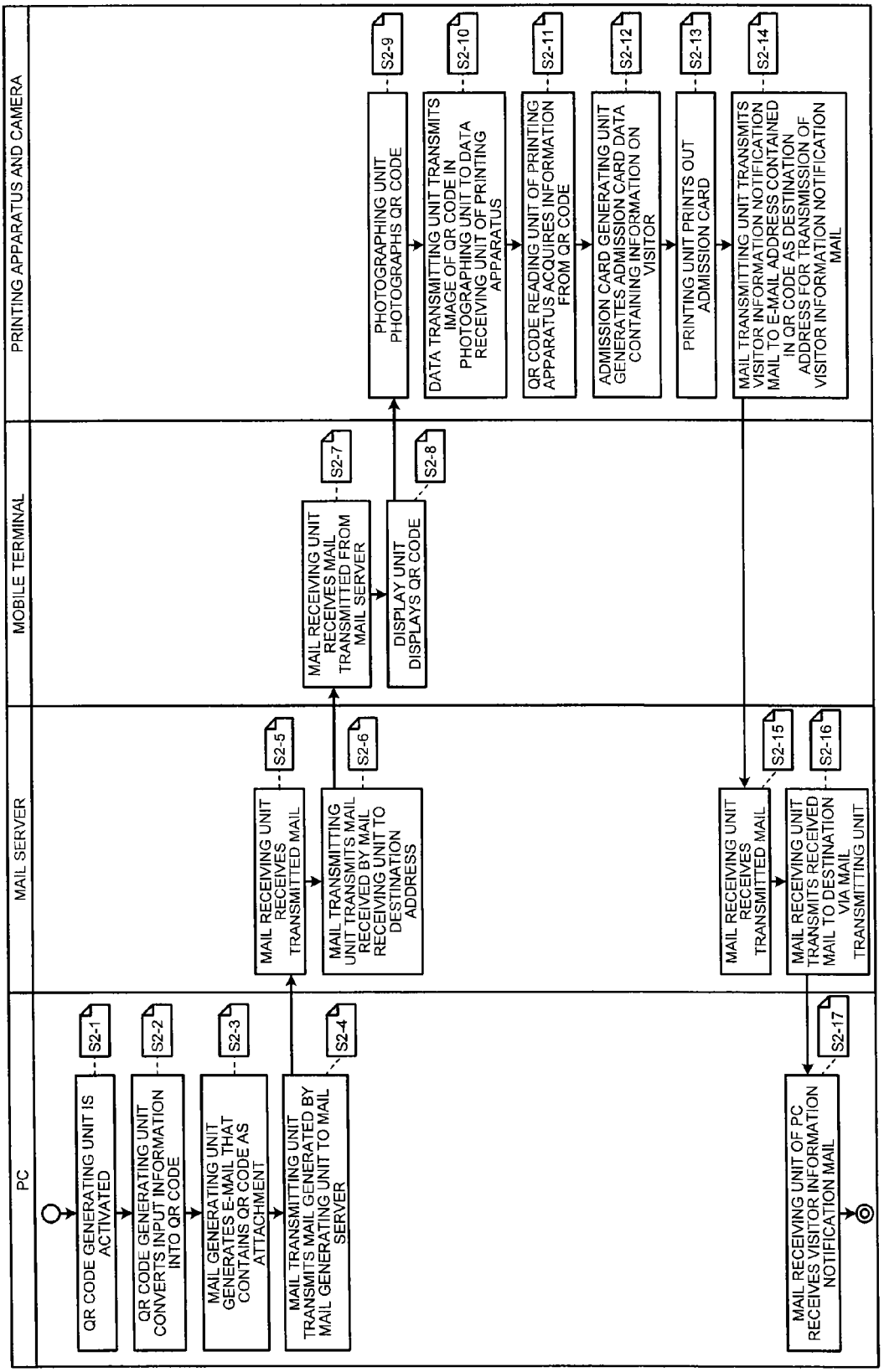

FIG.10

| NAME OF VISITOR | NAME OF VISITOR'S COMPANY | DESTINATION E-MAIL ADDRESS FOR TRANSMISSION OF VISITOR INFORMATION NOTIFICATION MAIL | STARTING AND ENDING DATES OF QR CODE EFFECTIVE PERIOD |
|---|---|---|---|
| TARO RICOH | XXXX CO., LTD. | ricoh.taroh@xxxx.com | STARTING DATE: ON JUNE 12, 2013 ENDING DATE: ON JUNE 13, 2013 |

FIG.11

| NAME OF VISITOR | NAME OF VISITOR'S COMPANY | TIME AND DATE OF VISIT AND ENTRY |
|---|---|---|
| TARO RICOH | XXXX CO., LTD. | 10:10 ON JUNE 12, 2013 |

IMAGE FORMING APPARATUS, IMAGE FORMING SYSTEM, AND COMPUTER PROGRAM PRODUCT

CROSS-REFERENCE TO RELATED APPLICATIONS

The present application claims priority to and incorporates by reference the entire contents of Japanese Patent Application No. 2013-211436 filed in Japan on Oct. 8, 2013 and Japanese Patent Application No. 2014-170917 filed in Japan on Aug. 25, 2014.

BACKGROUND OF THE INVENTION

1. Field of the Invention

The present invention relates to an image forming apparatus, an image forming system, and a computer program product.

2. Description of the Related Art

On an occasion of visiting a company, an event, a seminar, or the like, a procedure at the reception is required. As the procedure at the reception, the following steps, for example, may be necessary: the visitor writes down information on the visit; the reception notifies by telephone a person to meet the visitor that the visitor has arrived; and the reception provides an admission card.

Japanese Laid-open Patent Publication No. 2008-171350 discloses a visitor management system in which: a visit reception apparatus transmits a reception number corresponding to visit-schedule information to a terminal of a visitor; an admission card issuing apparatus transmits a reception number to the visit reception apparatus upon accepting the reception number; the visit reception apparatus transmits authentication information to the admission card issuing apparatus; the admission card issuing apparatus outputs the authentication information by printing out the authentication information on a printing medium; an admission gate apparatus reads out the authentication information as the printing medium is shown thereto and transmits the thus read authentication information to the visit reception apparatus; the visit reception apparatus determines whether to admit the entry and transmits control information based on a result of the determination to the admission gate apparatus; and the admission gate apparatus brings a gate into action in accordance with the control information.

However, it has been difficult to promptly issue a permit for entry to a visitor and notify a visitor-receiving person to receive the visitor that the visitor has arrived.

In view of the above, there is a need to provide an image forming apparatus, an image forming system, and a computer program product that make it possible to promptly issue a permit for entry to a visitor and notify a visitor-receiving person who is to receive the visitor that the visitor has arrived.

SUMMARY OF THE INVENTION

It is an object of the present invention to at least partially solve the problems in the conventional technology.

An image forming apparatus includes: an acquisition unit that acquires visitor information regarding a visitor and notification destination information indicating a destination of notification to a visitor-receiving person who is to receive the visitor; an issuance unit that, based on the visitor information acquired by the acquisition unit, issues a permit indicating that the visitor is allowed to enter; and a notification unit that notifies the destination of notification indicated by the notification destination information acquired by the acquisition unit that the visitor has arrived.

An image forming system includes an information processing apparatus, an image forming apparatus, and a mobile terminal carried by a visitor that are communicably connected to one another via a network. The information processing apparatus includes: an information image generating unit that generates an information image containing visitor information regarding a visitor and notification destination information indicating a destination of notification to a visitor-receiving person who is to receive the visitor, and a transmission unit that transmits the information image generated by the information image generating unit to the mobile terminal. The mobile terminal includes: a reception unit that receives the information image transmitted by the information processing apparatus; and a display unit that displays the information image received by the reception unit. The image forming apparatus includes: an acquisition unit that acquires the visitor information and the notification destination information contained in the information image; an issuance unit that, based on the visitor information acquired by the acquisition unit, issues a permit having an image printed thereon that contains the visitor information and indicates that the visitor is allowed to enter; and a notification unit that notifies the destination of notification indicated by the notification destination information acquired by the acquisition unit that the visitor has arrived.

A computer program product includes a non-transitory computer-readable medium containing an information processing program. The program causes a computer to execute: acquiring notification destination information indicating visitor information regarding a visitor and a destination of notification to a visitor-receiving person who is to receive the visitor; based on the acquired visitor information, issuing a permit indicating that the visitor is allowed to enter; and notifying the destination of notification indicated by the acquired notification destination information that the visitor has arrived.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart illustrating operation of the image forming system in issuing an admission card;

FIG. 10 is a table illustrating a configuration of data to be converted into a QR code (registered trademark);

FIG. 11 is a table illustrating a configuration of a visitor information notification mail;

DETAILED DESCRIPTION OF THE PREFERRED EMBODIMENTS

Figure 1:
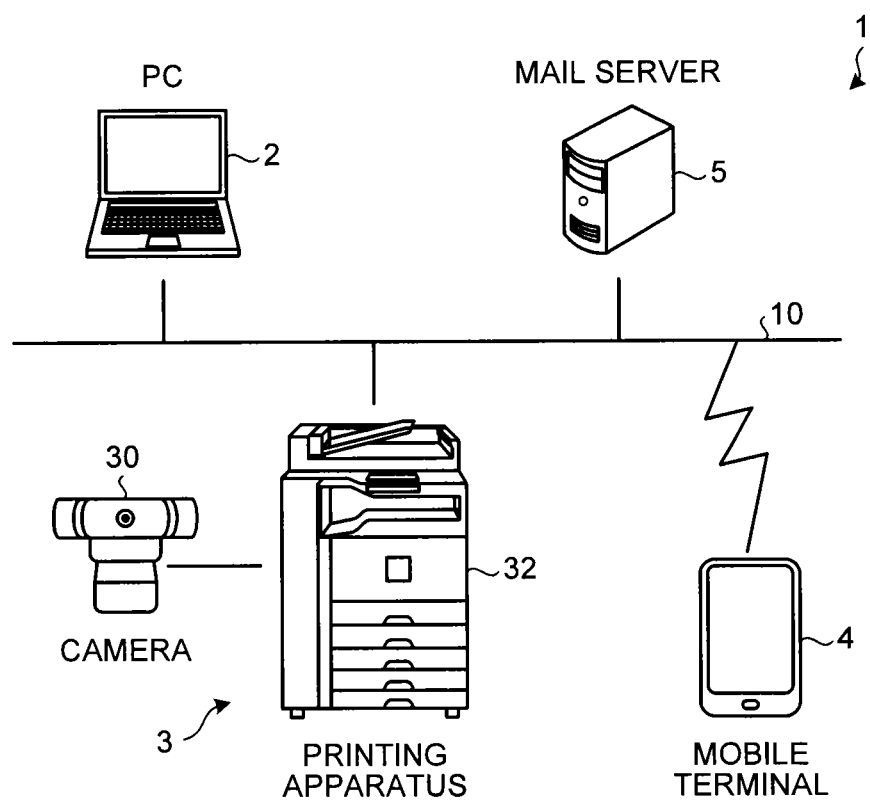
FIG. 1 is a diagram illustrating the configuration of an image forming system according to an embodiment of the present invention.

The following describes an image forming system according to an embodiment in detail with reference to the accompanying drawings. FIG. 1 is a diagram illustrating the configuration of an image forming system 1 according to the embodiment. As illustrated in FIG. 1, the image forming system 1 includes a personal computer (PC: information processing apparatus) 2, a terminal apparatus 3, a mobile terminal 4, and a mail server 5 that are connected to one another via a wired or wireless network 10. The terminal apparatus 3 includes, for example, a camera (image capturing apparatus) 30 that acquires image information and a printing apparatus (image forming apparatus) 32 that prints out an image. As in the case of the PC 2 and the mail server 5, the terminal apparatus 3 and the mobile terminal 4 each include a central processing unit (CPU), a storage device, an input device, and a display device (such as a touch panel), thereby having the functions of a computer.

Figure 2:
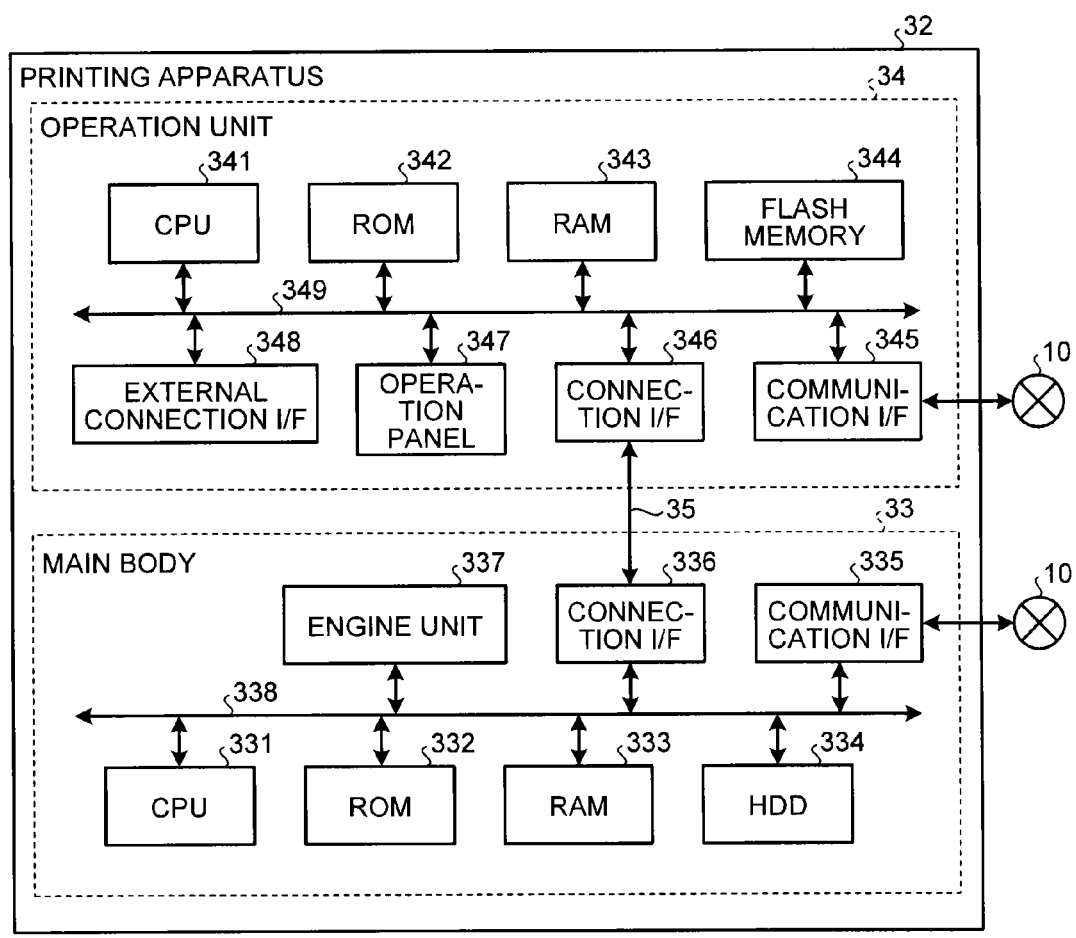
FIG. 2 is a diagram illustrating the hardware configuration of a printing apparatus.

Next, the hardware configuration of the printing apparatus 32 is described with reference to FIG. 2. As illustrated in FIG. 2, the printing apparatus 32 includes a main body 33 that can enable various functions such as a copy function, a scanner function, facsimile function, and a printer function and an operation unit 34 configured to accept an operation of a user. Here, accepting an operation of a user is a notion that includes acceptance of information (including a signal or the like that indicates coordinate values on a screen) that has been input according to the operation of the user. The main body 33 and the operation unit 34 are communicably connected to each other via a dedicated communication path 35. As the communication path 35, a path that complies with the universal serial bus (USB) standard can be used for example, and a path that complies with any desired standard may be used regardless of whether or not the path is wired or wireless.

The main body 33 can operate according to an operation accepted by the operation unit 34. Furthermore, the main body 33 can communicate with an external apparatus such as a client personal computer (PC), thus operating according to an instruction received from the external apparatus.

Firstly, the hardware configuration of the main body 33 is described. As illustrated in FIG. 2, the main body 33 includes a CPU 331, a read-only memory (ROM) 332, and a random-access memory (RAM) 333, a hard disk drive (HDD) 334, a communication interface (I/F) 335, a connection I/F 336, and an engine unit 337. These elements are connected to one another via a system bus 338.

The CPU 331 totally controls operation of the main body 33. The CPU 331 controls operation of the entire main body 33 by executing computer programs stored in the ROM 332, the HDD 334, or the like using the RAM 333 as a work area, thereby enabling the above-described functions such as a copy function, a scanner function, facsimile function, and a printer function.

The communication I/F 335 is an interface provided for connection to the network 10. The connection I/F 336 is an interface provided for communication with the operation unit 34 via the communication path 35.

The engine unit 337 is hardware that performs general information processing and processing other than communication that are performed for enabling a copy function, a scanner function, a facsimile function, and a printer function. For example, the engine unit 337 includes a scanner (image reading unit) that scans and reads an image of a document, a plotter (image forming unit) that performs printing on a sheet material such as paper, and a facsimile unit that performs facsimile communication. The engine unit 337 may further include a particular option such as a finisher that sorts sheet materials on which printing has been already performed or an automatic document feeder (ADF) that automatically feeds documents.

The hardware configuration of the operation unit 34 is described next. As illustrated in FIG. 2, the operation unit 34 includes a CPU 341, a ROM 342, a RAM 343, a flash memory 344, a communication I/F 345, a connection I/F 346, an operation panel 347, and an external connection I/F 348. These elements are connected to one another via a system bus 349.

The CPU 341 totally controls operation of the operation unit 34. The CPU 341 controls operation of the entire operation unit 34 by executing computer programs stored in the ROM 342, the flash memory 344, or the like using the RAM 343 as a work area, thereby enabling various functions to be described later such as the function of displaying information (an image) in accordance with an input from a user.

The communication I/F 345 is an interface provided for connection to the network 10. The connection I/F 346 is an interface provided for communication with the main body 33 via the communication path 35.

The operation panel 347 is configured to accept various inputs corresponding to operations of a user and to display various kinds of information (for example, information corresponding to an accepted operation, information indicating an operating state of the printing apparatus 32, and information indicating states of the settings). The operation panel 347 is, in this example, formed of a liquid crystal display (LCD) provided with a touch panel function, but is not limited to this example. For example, the operation panel 347 may be formed of an organic EL display provided with a touch panel function. Furthermore, in addition to or as an alternative to this, an operation unit formed of hardware keys, for example, and/or a display unit formed of a lamp, for example, may be provided.

Figure 3:
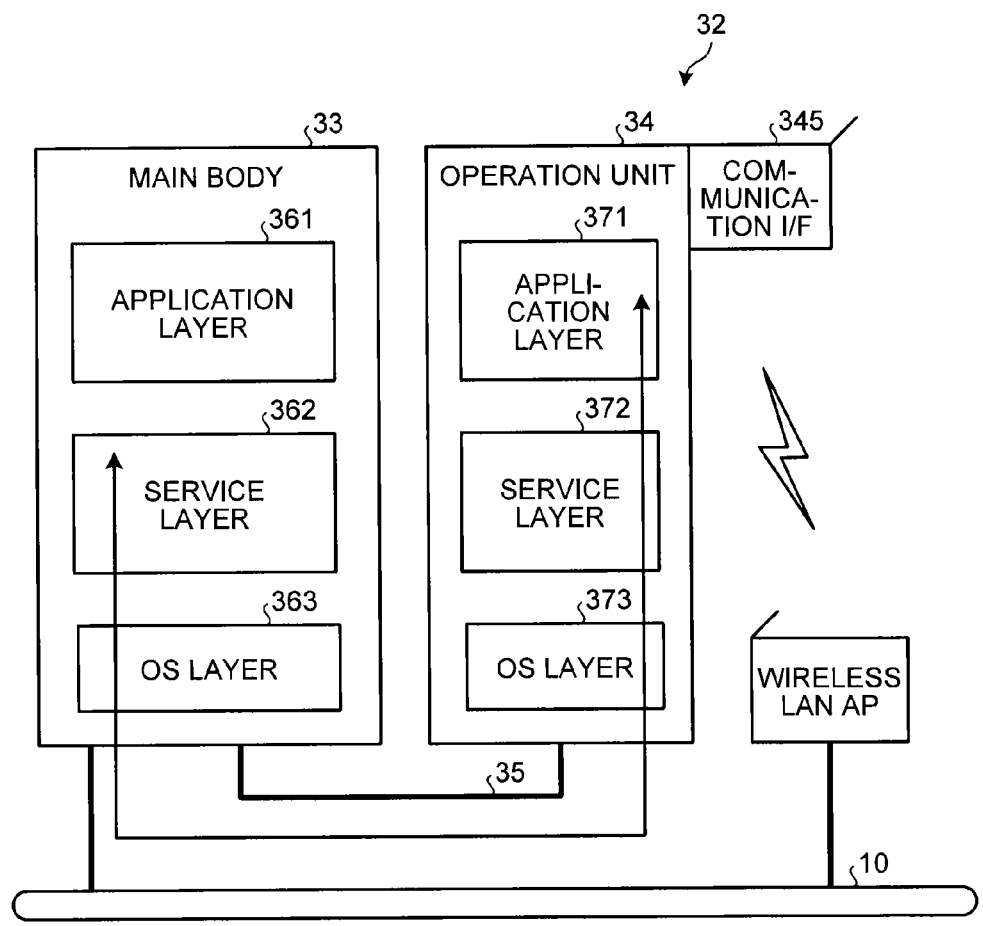
FIG. 3 is a schematic illustrating one example of the software configuration of the printing apparatus.

The software configuration of the printing apparatus 32 is described next. FIG. 3 is a schematic illustrating one example of the software configuration of the printing apparatus 32. As illustrated in FIG. 3, the main body 33 includes an application layer 361, a service layer 362, and an OS layer 363. Entities of the application layer 361, the service layer 362, and the OS layer 363 are various pieces of software stored in the ROM 332, the HDD 334, and the like. The CPU 331 executes these pieces of software to provide the various functions.

The software of the application layer 361 is application software (sometimes referred to simply as "application" hereinafter) for providing predetermined functions by causing hardware resources to operate. Examples of such applications include copy applications for providing a copy function, scanner applications for providing a scanner function, facsimile applications for providing a facsimile function, and printer applications for providing a printer function.

The software of the service layer 362 intervenes between the application layer 361 and the OS layer 363 and is software for providing the applications with an interface for enabling utilization of hardware resources of the main body 33. More specifically, it is software for providing the function of accepting requests for the hardware resources to operate and arbitrating between the requests to operate. Possible examples of such operation requests that are accepted by the service layer 362 include a request for a scanner to perform reading and a request for a plotter to perform printing.

The interface function provided by the service layer 362 is provided not only to the application layer 361 in the main body 33 but also to an application layer 371 in the operation unit 34. That is, the application layer 371 (application) of the operation unit 34 is also capable of enabling, via the interface function of the service layer 362, functions that utilize the hardware resources (for example, the engine unit 337) of the main body 33.

The software of the OS layer 363 is basic software (an operating system) for providing basic functions to control hardware included in the main body 33. The software of the service layer 362 converts requests from the various applications for using hardware resources into commands that can be interpreted by the OS layer 363, and passes the commands to the OS layer 363. Subsequently, when commands are executed by the software of the OS layer 363, the hardware resources operate according to the requests from the applications.

Similarly, the operation unit 34 includes an application layer 371, a service layer 372, and an OS layer 373. The hierarchical structure of the application layer 371, the service layer 372, and the OS layer 373, which are included in the operation unit 34, is the same as that of the layers in the main body 33. However, functions provided by applications of the application layer 371 and kinds of operation requests that can be accepted by the service layer 372 are different from those in the corresponding layers in the main body 33. The applications of the application layer 371 may be software for providing predetermined functions by causing the hardware resources of the operation unit 34 to operate, but is chiefly software for providing a user interface (UI) function for the purpose of enabling operations and display for the functions (copy function, scanner function, facsimile function, and printer function) provided by the main body 33.

In the present embodiment, to maintain mutual independence of the functions, the software of the OS layer 363 in the main body 33 and the software of the OS layer 373 in the operation unit 34 are different from each other. In other words, the main body 33 and the operation unit 34 operate on different operating systems and independently of each other. For example, it is possible to use Linux (registered trademark) as the software of the OS layer 363 in the main body 33 and use Android (registered trademark) as the software of the OS layer 373 in the operation unit 34.

As described above, in the printing apparatus 32 according to the present embodiment, the main body 33 and the operation unit 34 operate on the operating systems independent of each other, and communication between the main body 33 and the operation unit 34 is performed not as interprocess communication within the same apparatus but as communication between different apparatuses. Operation (command communication) of the operation unit 34 for transmitting information (contents of instructions from a user) accepted thereby to the main body 33; and operation of the main body 33 for notifying the operation unit 34 of an event correspond to this. Here, the operation unit 34 can use the functions of the main body 33 by performing command communication with the main body 33. Examples of the events of which the operation unit 34 is notified by the main body 33 include: states of execution of operation in the main body 33; and states of settings at the main body 33.

In the present embodiment, since power is supplied to the operation unit 34 from the main body 33 via the communication path 35, control of power supply to the operation unit 34 can be performed separately from (independently of) control of power supply to the main body 33.

Figure 4:
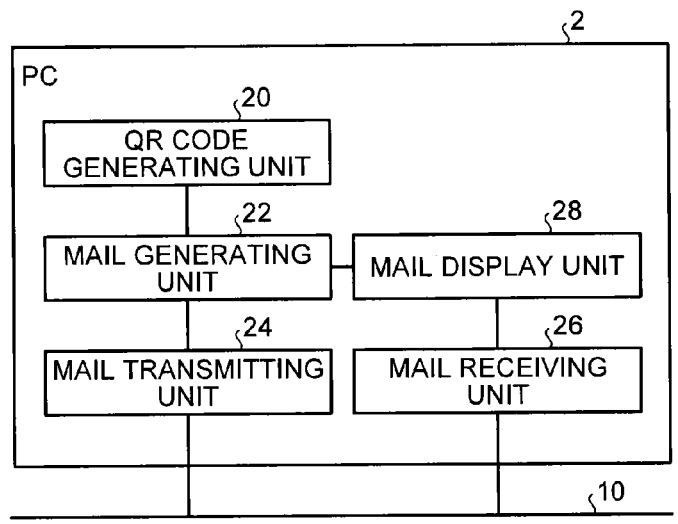
FIG. 4 is a functional block diagram illustrating functions of a PC.

The functional configuration of the PC 2 is described next. FIG. 4 is a functional block diagram illustrating functions of the PC 2. As illustrated in FIG. 4, the PC 2 includes a QR code generating unit 20, a mail generating unit 22, a mail transmitting unit (transmission unit) 24, a mail receiving unit 26, and a mail display unit 28.

The QR code generating unit 20 is a module that generates a QR code (registered trademark) (an information image) containing information, such as input information on a visitor (visitor information), for example, the name of the visitor and the name of the visitor's company; a mail address (e-mail address: notification destination information) of a visitor-receiving person such as a person to meet the visitor; and information (to be described later with reference to FIG. 10) indicating the effective period of the QR code (registered information). Here, the QR code generating unit 20 is not limited to generation of a QR code and has a function as, for example, an information image generating unit that generates an information image containing information unable to be read by a visitor.

The mail generating unit 22 is a module that generates a mail that has a QR code generated by the QR code generating unit 20 as an attachment and has its destination set to a visitor.

The mail transmitting unit 24 is a module that transmits a mail (e-mail) generated by the mail generating unit 22 to the mail server 5 via the network 10. The mail receiving unit 26 is a module that receives a mail for, for example, notification about a visitor via the network 10. The mail display unit 28 is a module that displays a mail received by the mail receiving unit 26.

The QR code generating unit 20, the mail generating unit 22, the mail transmitting unit 24, and the mail receiving unit 26 are included in, for example, an application (QR code generation application: application) to be executed by the PC 2. That is, a visitor-receiving person who is to receive the visitor, such as a person who is to meet the visitor, is enabled to generate a QR code and transmit a mail having the QR code as an attachment by using the PC 2 and executing the QR code generation application.

The PC 2 may have a function as a notification unit that receives a visitor information notification mail to be described later so as to notify a visitor-receiving person, such as a person who is to meet the visitor, that the visitor has arrived.

Figure 5:
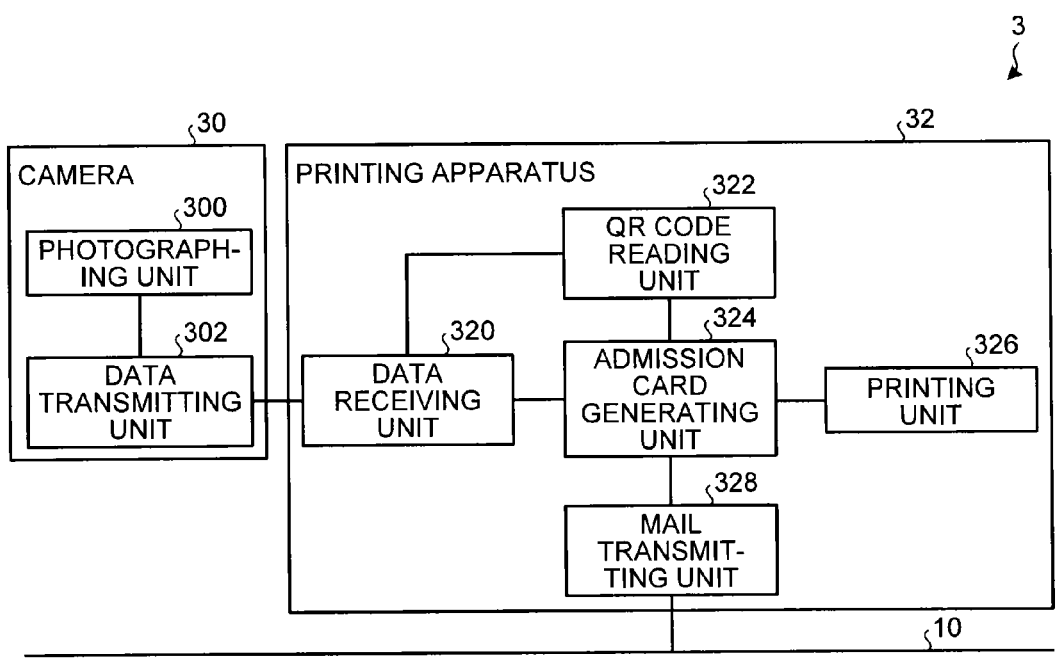
FIG. 5 is a functional block diagram illustrating functions of a terminal apparatus.

FIG. 5 is a functional block diagram illustrating functions of the terminal apparatus 3. The terminal apparatus 3 is configured so that the camera 30 and the printing apparatus 32 may communicate with each other via a wired connection.

The camera 30 includes a photographing unit 300 and a data transmitting unit 302. The photographing unit 300 is a module that photographs a QR code and generates image data, that is, this unit acquires image information. The data transmitting unit 302 is a module that transmits image data (a QR code image) of a QR code generated by the photographing unit 300 to the terminal apparatus 3.

The printing apparatus 32 includes a data receiving unit 320, a QR code reading unit 322, an admission card (permit) generating unit 324, a printing unit 326, and a mail transmitting unit 328 and has a function as an issuance unit that issues a permit.

The data receiving unit 320 is a module that receives via the network 10 a QR code image transmitted by the data transmitting unit 302 of the camera 30, and also functions as an acquisition unit for acquiring information contained in the QR code image.

The QR code reading unit 322 is a module that reads a QR code image received by the data receiving unit 320 and acquires information contained in the QR code image that indicates, for example, visitor information, a mail address of a visitor-receiving person who is to receive a visitor, and the effective period of the QR code.

The admission card generating unit 324 is a module that generates admission card data by using visitor information acquired by the QR code reading unit 322 and generates a visitor information notification mail (to be described later with reference to FIG. 11), for example, when the admission card is printed out. The visitor information notification mail notifies a visitor-receiving person who is to receive a visitor that the visitor has arrived.

The printing unit 326 is a module that prints out an image corresponding to admission card data generated by the admission card generating unit 324 on a recording medium such as a paper sheet. That is, the printing unit 326 functions as an issuance unit that issues an admission card (permit).

The mail transmitting unit 328 is a module that transmits a visitor information notification mail generated by the admission card generating unit 324 to the mail server 5. That is, the mail transmitting unit 328 functions also as a notification unit that notifies a notification destination indicated by notification destination information acquired by the data receiving unit 328 that a visitor has arrived.

It is noted that the terminal apparatus 3 is configured to enable the above-described functions by executing applications (for example, an admission card issuance application) installed in the terminal apparatus 3.

Figure 6:
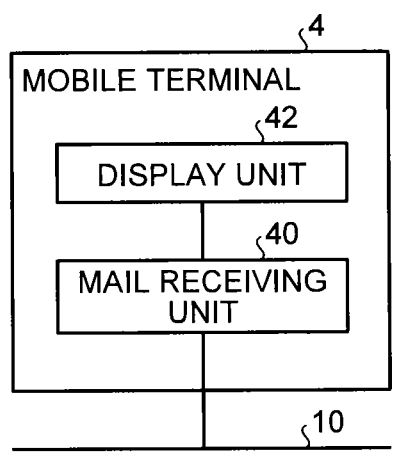
FIG. 6 is a functional block diagram illustrating functions of a mobile terminal.

FIG. 6 is a functional block diagram illustrating functions of the mobile terminal 4. As illustrated in FIG. 6, the mobile terminal 4 includes a mail receiving unit (reception unit) 40 and a display unit 42 and is carried by a visitor. The mail receiving unit 40 is a module that receives, via the network 10, a mail transmitted by the mail server 5 and containing a QR code as an attachment. The display unit 42 is a module that displays, for example, the QR code contained as an attachment in the mail received by the mail receiving unit 40 on a screen (not illustrated) of the mobile terminal 4.

It is noted that the mobile terminal 4 is configured to enable the above-described functions by executing applications installed in the mobile terminal 4.

Figure 7:
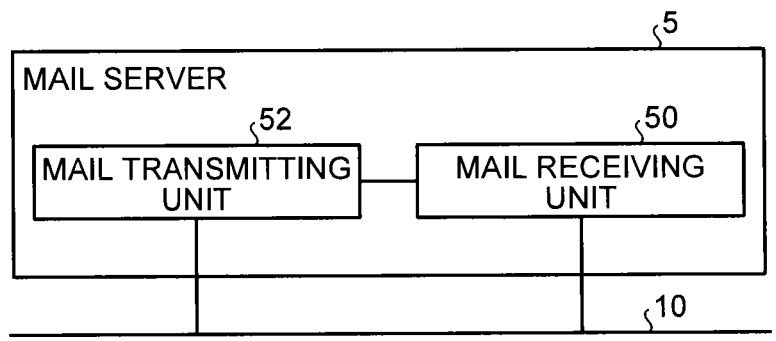
FIG. 7 is a functional block diagram illustrating functions of a mail server.

FIG. 7 is a functional block diagram illustrating functions of the mail server 5. As illustrated in FIG. 7, the mail server 5 includes a mail receiving unit 50 and a mail transmitting unit 52. The mail receiving unit 50 is a module that receives, via the network 10, a mail transmitted by the PC 2 and containing a QR code as an attachment and a visitor information notification mail transmitted by the printing apparatus 32. The mail transmitting unit 52 is a module that transmits a mail received by the mail receiving unit 50 to a destination set in the mail via the network 10.

It is noted that the functions of the PC2, the terminal apparatus 3, the mobile terminal 4, and the mail server 5 are each configured with software to be executed by a CPU and the like, with hardware, or with both.

Figure 8:
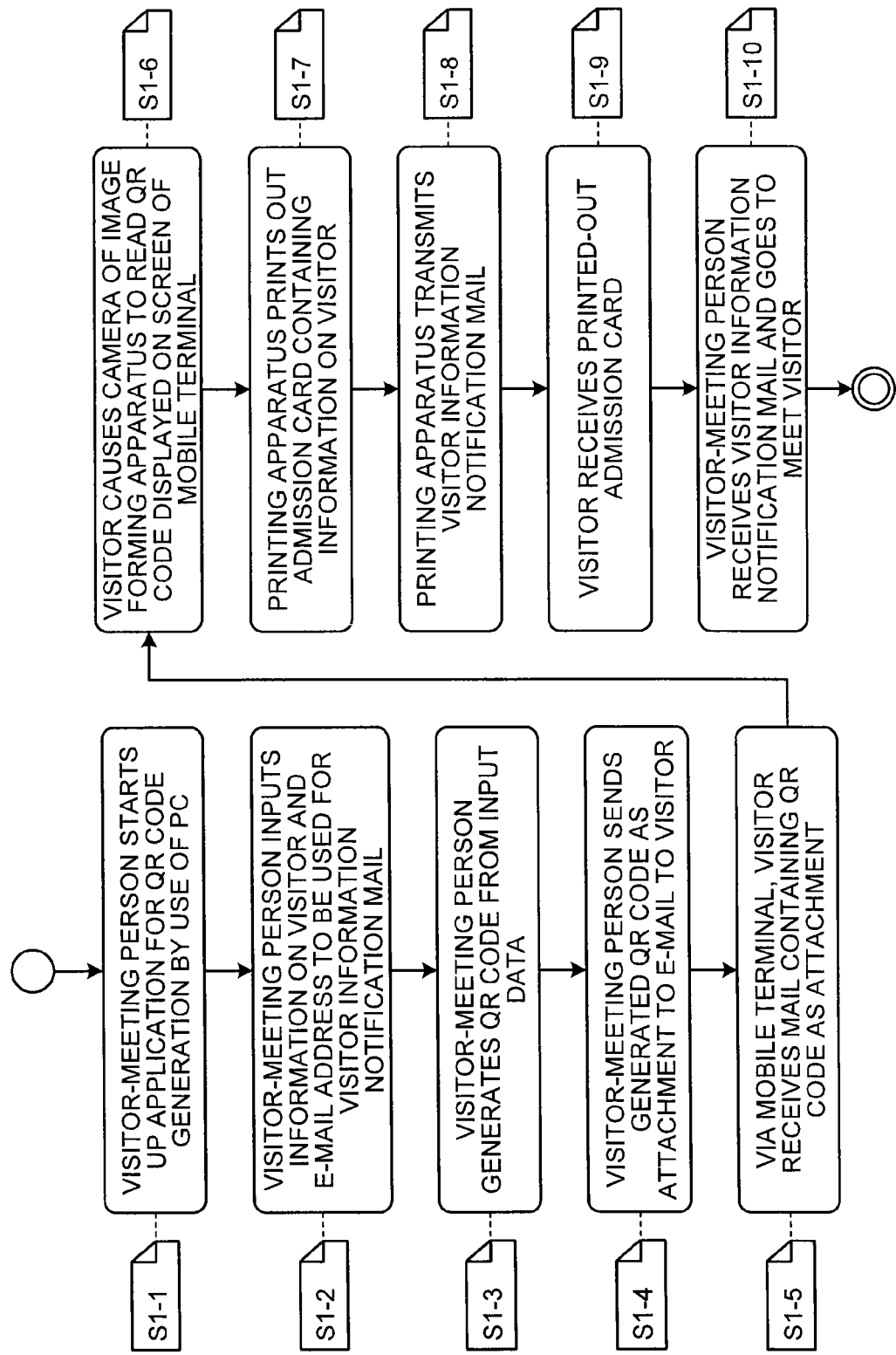
FIG. 8 is a flowchart illustrating a procedure for when an image forming system issues an admission card to a visitor.

A procedure for when the image forming system 1 issues an admission card (permit for entry) to a visitor is described next. FIG. 8 is a flowchart illustrating the procedure for when the image forming system 1 issues an admission card to a visitor. As illustrated in FIG. 8, at the beginning, a visitor-receiving person (for example, a person who is to meet the visitor) starts the QR code generation application (app) using the PC 2 (S1-1).

Subsequently, the visitor-meeting person inputs, on an input screen of the QR code generation application, information such as visitor information and a mail address (e-mail address) of the visitor-meeting person (S1-2). The visitor-meeting person may input other information such as the name of the visitor-meeting person. The visitor-meeting person may input, as a destination e-mail address for a visitor information notification mail, a mail address of another person instead of a mail address of the visitor-meeting person.

The visitor-meeting person converts the information input at the step of S1-2 into a QR code using the QR code generation application (S1-3). The QR code is saved as an image.

The visitor-meeting person attaches the generated QR code to a mail and transmits the mail to the mobile terminal 4 of the visitor (S1-4).

The visitor receives the transmitted mail that contains the QR code as an attachment via the mobile terminal 4 (S1-5).

Upon arriving, the visitor causes the camera 30 of the terminal apparatus 3 to read the QR code displayed on the screen of the mobile terminal 4 (S1-6).

The printing apparatus 32 prints out an admission card containing the visitor information contained in the QR code read at the step of S1-6 (S1-7). At this step, the printing apparatus 32 may print out a map, information on the visitor-meeting person, and/or the like on the admission card in addition to the visitor information.

While printing out the admission card at the step of S1-7, the printing apparatus 32 transmits a visitor information notification mail (visitor information notification mail) to the mail address of the visitor-meeting person read from the QR code (S1-8).

The visitor receives the admission card printed out at the step of S1-7 (S1-9).

The visitor-meeting person receives, for example, using the PC 2, the visitor information notification mail transmitted at the step of S1-8, and goes to meet the visitor (S1-10).

Operation of the image forming system 1 in issuing an admission card (permit for entry) is described next. FIG. 9 is a flowchart illustrating the operation of the image forming system 1 in issuing an admission card (permit for entry). The operation of the image forming system 1 illustrated in FIG. 9 is described in association with the procedure illustrated in FIG. 8.

The step of S1-1 causes the PC 2 to start up the QR code generating unit 20 (S2-1).

The steps of S1-2 and S1-3 cause the QR code generating unit 20 of the PC 2 to convert input information (such as visitor information, a mail address of a visitor-receiving person, and the effective period of a QR code) into a QR code (S2-2). The QR code is saved as an image.

The step of S1-4 causes the mail generating unit 22 of the PC 2 to generate a mail containing the QR code as an attachment and having a visitor as a destination thereof (S2-3). This step also causes the mail transmitting unit 24 of the PC 2 to transmit the mail generated by the mail generating unit 22 to the mail server 5 (S2-4). This step also causes the mail receiving unit 50 of the mail server 5 to receive the transmitted mail (S2-5). This step further causes the mail transmitting unit 52 of the mail server 5 to transmit the mail received by the mail receiving unit 50 to the destination (visitor) (S2-6).

The step of S1-5 causes the mail receiving unit 40 of the mobile terminal 4 to receive the mail transmitted by the mail server 5 (S2-7).

The step of S1-6 causes the display unit 42 of the mobile terminal 4 to display the QR code contained as an attachment in the mail (S2-8). This step also causes the photographing unit 300 of the camera 30 to photograph the QR code displayed by the display unit 42 and then convert the QR code into image data (S2-9). This step also causes the data transmitting unit 302 of the camera 30 to transmit the QR code image data to the data receiving unit 320 of the printing apparatus 32 (S2-10). This step further causes the QR code reading unit 322 of the printing apparatus 32 to read the QR code image and acquire information (such as the visitor information, the mail address of the visitor-receiving person, and the effective period of the QR code) (S2-11). When the mobile terminal 4 determines the effective period of the QR code to have expired, it displays an error message and does not proceed to the subsequent processes.

The step of S1-7 causes the admission card generating unit 324 of the printing apparatus 32 to generate admission card data containing the visitor information (S2-12). This step also causes the printing unit 326 of the printing apparatus 32 to print out an admission card using the generated admission card data (S2-13).

The step of S1-8 causes the mail transmitting unit 328 of the printing apparatus 32 to transmit the visitor information notification mail to the mail address of the visitor-meeting person (mobile terminal 4) (S2-14). This step also causes the mail receiving unit 50 of the mail server 5 to receive the mail transmitted from the printing apparatus 32 (S2-15). This step also causes the mail transmitting unit 52 of the mail server 5 to transmit the mail to the destination (mobile terminal 4) (S2-16).

The step of S1-9 causes the visitor to receive the admission card printed out at the step of S2-13.

The step of S1-10 causes the mail receiving unit 26 of the PC 2 to receive the visitor information notification mail (S2-17). As a result, the visitor-meeting person sees the received visitor information notification mail using the PC 2 and goes to meet the visitor.

FIG. 10 is a table illustrating a configuration of data to be converted into a QR code. As illustrated in FIG. 10, information to be converted into a QR code includes the name of a visitor, the name of the visitor's company, a destination e-mail address for transmission of a visitor information notification mail, and the effective period of the QR code (effective period information on a permit). The destination e-mail address for transmission of the visitor information notification mail is a mail address of a visitor-receiving person (such as a person who is to meet a visitor). A configuration of data to be converted into a QR code is not limited to the one illustrated in FIG. 10.

FIG. 11 is a table illustrating a configuration of the visitor information notification mail. As illustrated in FIG. 11, the visitor information notification mail contains the name of the visitor and the name of the visitor's company read from the QR code, and a time and date of visit and entry (time and date of issuance of an admission card). Note that a configuration of the visitor information notification mail is not limited to the one illustrated in FIG. 11.

Next, examples of screens (user interface screens) displayed by the terminal apparatus 3 when the image forming system 1 issues an admission card are described following the order of operations.

Figure 12:
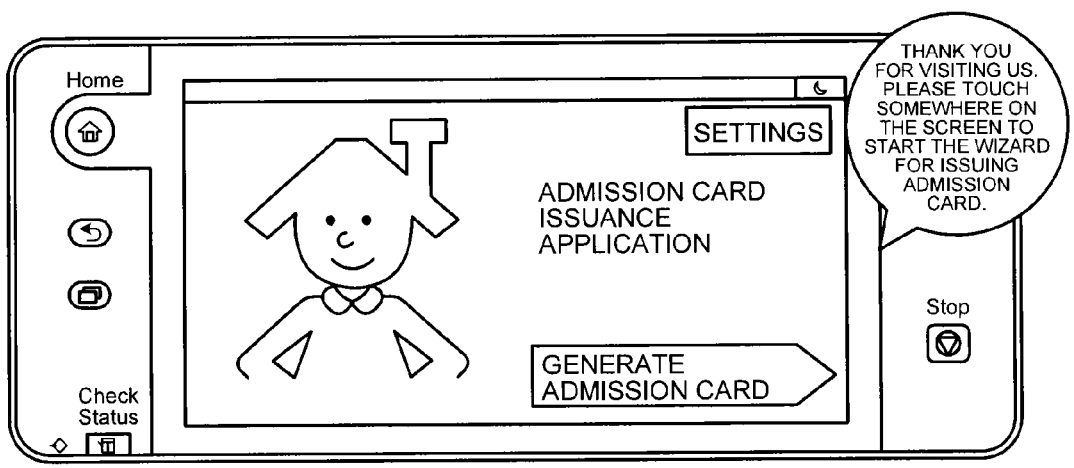
FIG. 12 is a diagram illustrating a start screen displayed by the printing apparatus when an admission card issuance application is started.

FIG. 12 is diagram illustrating a start screen displayed by the printing apparatus 32 when an admission card issuance application is started up. The printing apparatus 32 may be configured to guide the visitor to enable voice input. The printing apparatus 32 causes the screen to transition to a screen illustrated in FIG. 13, for example, when the visitor taps a region of "GENERATE ADMISSION CARD" on a touch panel.

Figure 13:
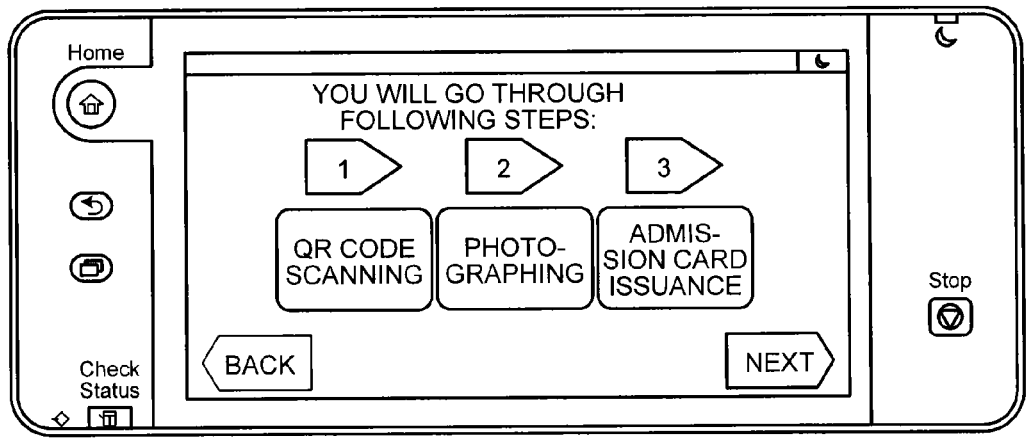
FIG. 13 is a diagram illustrating a screen displayed by the printing apparatus to inform a visitor of operational steps necessary for admission card issuance.

FIG. 13 is a diagram illustrating a screen displayed by the printing apparatus 32 to inform the visitor of operational steps necessary for the admission card issuance. For example, the printing apparatus 32 causes the screen to transition to a screen illustrated in FIG. 14 when the visitor taps a region of "NEXT" on the touch panel, and to transition to the screen (a screen immediately before the current one) illustrated in FIG. 12 when the visitor taps a region of "BACK" thereon. The following assumes that any region of "BACK" accepts the same operation as described here.

Figure 14:
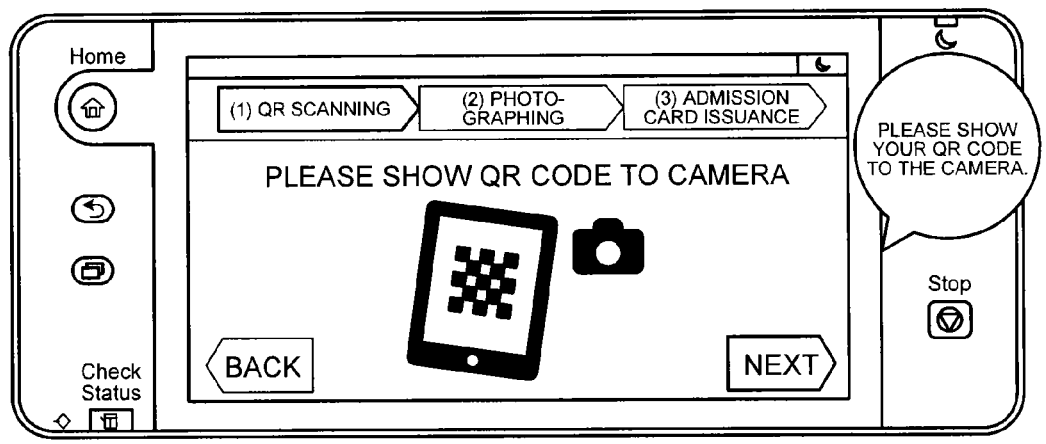
FIG. 14 is a diagram illustrating a screen displayed by the printing apparatus to prompt the visitor to allow a camera to read a QR code.

FIG. 14 is a diagram illustrating a screen displayed for the printing apparatus 32 to prompt the visitor to allow the camera 30 to read the QR code. When the visitor taps a region of "NEXT" on the touch panel while showing the QR code displayed by the mobile terminal 4 to the camera 30, the printing apparatus 32 causes the camera 30 to start reading the QR code and causes the screen to transition to a screen illustrated in FIG. 15.

Figure 15:
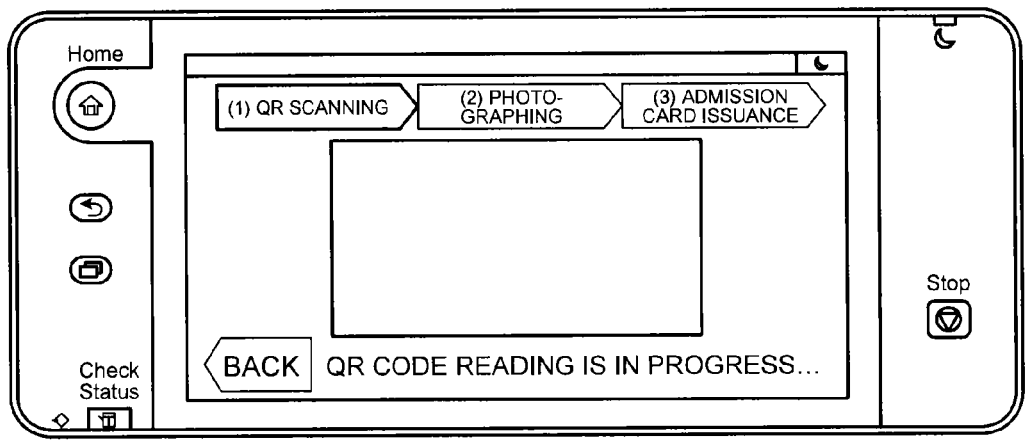
FIG. 15 is a diagram illustrating a screen displayed by the printing apparatus while the camera is reading a QR code.

FIG. 15 is a diagram illustrating a screen displayed by the printing apparatus 32 while the camera 30 is reading the QR code. An image photographed by the camera 30 is displayed inside a rectangular frame illustrated at a central portion of FIG. 15. The visitor shows the mobile terminal 4 to the camera 30 so that an image of the QR code displayed by the mobile terminal 4 is displayed inside the rectangular frame. When reading of the QR code is completed, the printing apparatus 32 causes the screen to transition to a screen illustrated in FIG. 16.

Figure 16:
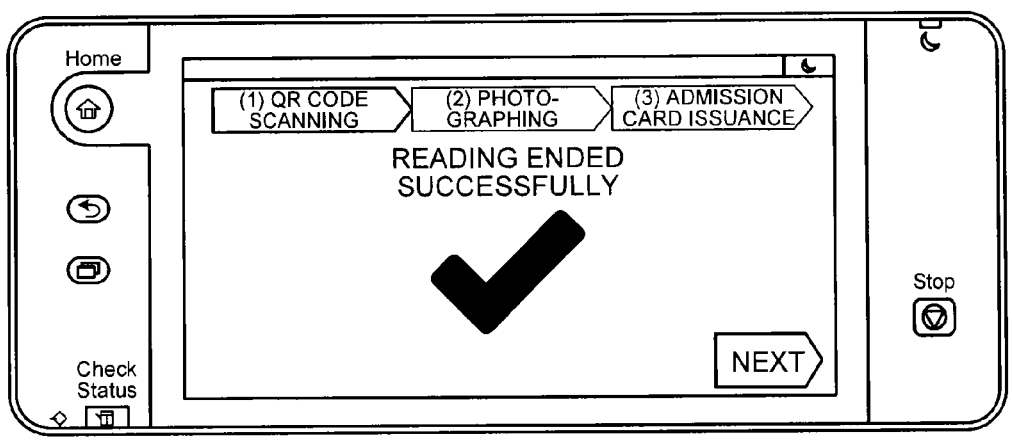
FIG. 16 is a diagram illustrating a screen displayed by the printing apparatus when reading of a QR code is completed successfully.

FIG. 16 is a diagram illustrating a screen displayed by the printing apparatus 32 when reading of the QR code is completed successfully. The printing apparatus 32 causes the screen to transition to a screen illustrated in FIG. 17, for example, when the visitor taps a region of "NEXT" on the touch panel.

Figure 17:
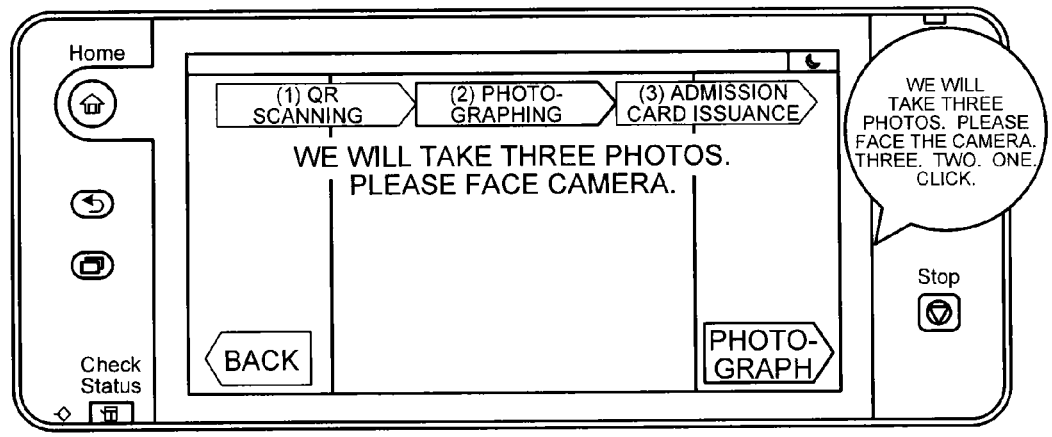
FIG. 17 is a diagram illustrating a screen displayed by the printing apparatus to prompt the visitor to allow the camera to take facial photographs of the visitor.

FIG. 17 is a diagram illustrating a screen displayed by the printing apparatus 32 to prompt the visitor to allow the camera 30 to take facial photographs of the visitor. In this example, a facial photograph of the visitor is printed on the admission card. When the visitor taps a region of "PHOTOGRAPH" on the touch panel of the printing apparatus 32 after making adjustment to allow the camera 30 to take a facial photograph of the visitor in the same manner as the case illustrated in FIG. 15, the camera 30 takes facial photographs of the visitor. The printing apparatus 32 displays a screen illustrated in FIG. 18. In this example, three photographs are taken.

Figure 18:
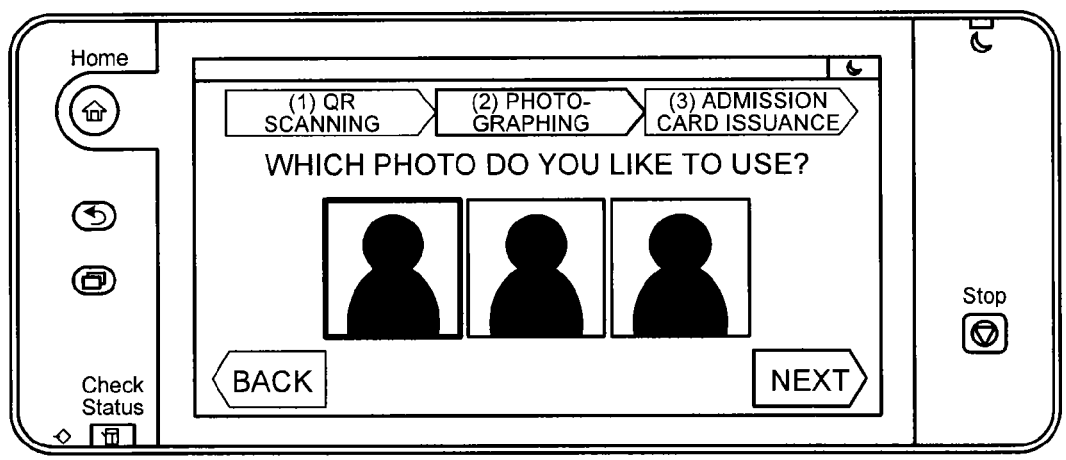
FIG. 18 is a diagram illustrating a screen displayed by the printing apparatus to allow the visitor to select one from three facial photographs taken by the camera.

FIG. 18 is a diagram illustrating a screen displayed by the printing apparatus 32 so as to allow the visitor to select one from the three facial photographs taken by the camera 30. The printing apparatus 32 causes the screen to transition to a screen illustrated in FIG. 19, for example, when the visitor taps a region of "NEXT" after tapping a photograph that the visitor would like to select.

Figure 19:
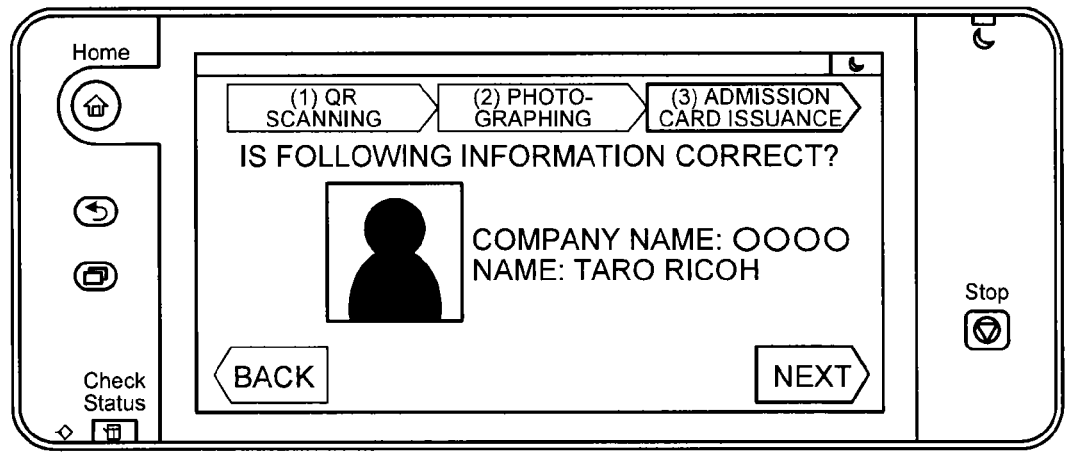
FIG. 19 is a diagram illustrating a screen displayed by the printing apparatus to prompt the visitor to check the content of an admission card to be printed out by the printing apparatus.

FIG. 19 is a diagram illustrating a screen to be displayed by the printing apparatus 32 so as to allow the visitor to check the content of the admission card to be printed out by the printing apparatus 32. The printing apparatus 32 displays information and a facial photograph to be printed out on the admission card, and makes a final confirmation on the content before the issuance of the admission card. The visitor checks the content to be printed out and, after confirming that there is no problem, taps a region of "NEXT". When the region of "NEXT" is tapped, the printing apparatus 32 starts printing out (issuing) the admission card and causes the screen to transition to a screen illustrated in FIG. 20. During this transitioning, the printing apparatus 32 transmits a visitor information notification mail to the destination e-mail address for transmission of the visitor information notification mail, which is contained in the QR code.

Figure 20:
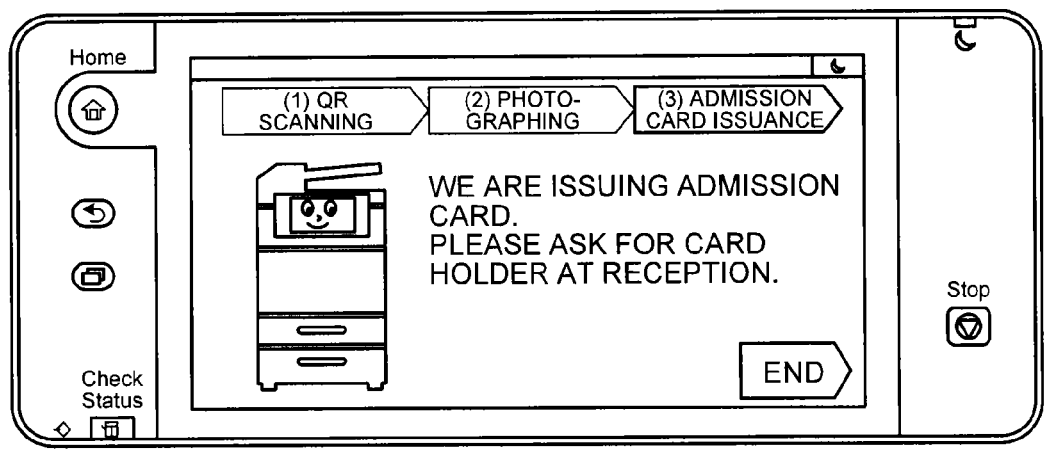
FIG. 20 is a diagram illustrating a screen displayed by the printing apparatus to notify the visitor that an admission card is being issued.

FIG. 20 is a diagram illustrating a screen displayed by the printing apparatus 32 to notify the visitor that the admission card is being issued. The visitor waits for the admission card to be printed out and receives the admission card. The printing apparatus 32 causes the screen to transition to the start screen (FIG. 12), for example, when the visitor taps a region of "END" on the touch panel.

The terminal apparatus 3 may be configured to allow an input of the visitor information via an input device, as an alternative to causing the camera 30 to read the QR code, in case of absence of the QR code (such as when the visitor forgot to prepare for display of the QR code or when the mobile terminal 4 is not able to receive the mail containing the QR code as an attachment).

That is, the image forming system 1 makes it unnecessary for a visitor to write down visitor information in a document at the time of visit. Furthermore, the image forming system 1 transmits a visitor information notification mail to a visitor-meeting person when issuing an admission card, thereby making it possible to shorten a waiting time of a visitor. Moreover, an image including visitor information is printed on an admission card, which enables identification of a visitor.

Embodiments of the image forming system 1 are not limited to the above described embodiment and may be configured through combinations of various functions as follows.

For example, the QR code generating unit 20 may generate a QR code that contains mail addresses of a plurality of visitor-receiving persons. In this case, the admission card generating unit 324 may generate a visitor information notification mail for which mail addresses of the visitor-receiving persons are set as destinations (notification destinations). The mail transmitting unit 328 may transmit the visitor information notification mail for which the mail addresses of the visitor-receiving persons are set as destinations (notification destinations).

The mail transmitting unit 328 may set a destination mail address (for example, the mobile terminal 4, the PC 2, or another information processing apparatus) for transmission of a mail-opening confirmation mail in advance when a visitor information notification mail is generated, and transmit the visitor information notification mail. In response to the visitor information notification mail received by the mail receiving unit 26, the mail transmitting unit 24 may transmit, to the destination mail address set in advance for transmission, a mail-opening confirmation mail or a return mail that indicates that the visitor information notification mail has been opened at the destination.

When a visitor information notification mail is generated, the admission card generating unit 324 may generate the visitor information notification mail with a destination mail address (for example, the mobile terminal 4, the PC 2, or another information processing apparatus) for transmission of a mail-opening confirmation mail set in advance. The mail generating unit 22 may generate a return mail in which a return message to the visitor information notification mail is written.

Provided that a mail-opening confirmation mail has not been transmitted in response to a visitor information notification mail for a predetermined time period, the mail transmitting unit 24 may forward the visitor information notification mail to another mail address that has been set in advance.

The QR code reading is not limited to reading a QR code displayed by the mobile terminal 4, and the terminal apparatus 3 may read a QR code from a paper medium having the QR code printed thereon. The terminal apparatus 3 may be configured to accept information contained in a QR code via an input device of the printing apparatus 32, instead of being configured to cause the camera 30 to read the QR code.

The printing apparatus 32 may be configured to store data for a layout of an admission card and to generate admission card data by placing pieces of data such as visitor information in the layout.

The printing apparatus 32 may be configured to determine not to issue an admission card when information contained in the QR code, for example, the issuing date of the admission card, is not within the effective period.

Each of the above-described functions of the respective units of the printing apparatus 32 is enabled when the CPU (331 or 341) executes computer programs stored in a storage device (for example, the ROM 332, the HDD 334, the ROM 342, and the flash memory 344). However, it is not limited thereto and at least a part of the above-described functions of the respective units of the printing apparatus 32 may be enabled by dedicated hardware circuits (for example, semiconductor integrated circuits). Furthermore, the storage device may be enabled by, for example, the HDD 334 at the main body 33 or by, for example, the flash memory 344 at the operation unit 34.

The above-described embodiment has a configuration in which the main body 33 and the operation unit 34 operate independently of each other on the different operating systems. However, it is not limited thereto and another configuration is also applicable in which the main body 33 and the operation unit 34 operate on the same operating system.

Each of the programs executed in the printing apparatus 32 of the above-described embodiment may be recorded in a computer-readable recording medium, such as a compact disc read-only memory (CD-ROM), a flexible disk (FD), a compact disc recordable (CD-R), a digital versatile disc (DVD), or a universal serial bus (USB) memory, as a file of an installable form or executable form to be provided. Alternatively, the program may be provided or distributed via a network such as the Internet. Otherwise, such various programs may be previously embedded in a non-volatile recording medium such as a read-only memory (ROM) to be provided.

According to an embodiment, it is possible to promptly issue a permit for entry to a visitor and notify a visitor-receiving person who is to receive the visitor that the visitor has arrived.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    an acquisition unit that acquires, from a mobile terminal carried by a visitor, visitor information regarding the visitor and notification destination information indicating a destination of notification to a visitor-receiving person who is to receive the visitor;
    an issuance unit that, based on the visitor information acquired by the acquisition unit, issues a permit indicating that the visitor is allowed to enter; and
    a notification unit that notifies the destination of notification indicated by the notification destination information acquired by the acquisition unit that the visitor has arrived, wherein
    the acquisition unit acquires the visitor information and the notification destination information via an image capturing apparatus that acquires an encoded information image that contains the visitor information and the notification destination information, and
    the issuance unit issues the permit by printing out an image that includes the visitor information.

2. An image forming system including an information processing apparatus, an image forming apparatus, and a mobile terminal carried by a visitor that are communicably connected to one another via a network,
    the information processing apparatus comprising:
        an information image generating unit that generates an information image containing visitor information regarding a visitor and notification destination information indicating a destination of notification to a visitor-receiving person who is to receive the visitor, and
        a transmission unit that transmits the information image generated by the information image generating unit to the mobile terminal,
    the mobile terminal comprising:
        a reception unit that receives the information image transmitted by the information processing apparatus; and
        a display unit that displays the information image received by the reception unit,
    the image forming apparatus comprising:
        an acquisition unit that acquires the visitor information and the notification destination information contained in the information image;
        an issuance unit that, based on the visitor information acquired by the acquisition unit, issues a permit having an image printed thereon that contains the visitor information and indicates that the visitor is allowed to enter; and
        a notification unit that notifies the destination of notification indicated by the notification destination information acquired by the acquisition unit that the visitor has arrived.

3. The image forming system according to claim 2, wherein
    the information image generating unit generates an information image containing notification destination information indicating a plurality of destinations of notification, and
    the notification unit notifies the plurality of destinations of notification indicated by the notification destination information that the visitor has arrived.

4. The image forming system according to claim 2, wherein
    the information processing apparatus further comprises a mail generating unit that generates a mail containing as an attachment the information image generated by the information image generating unit,
    the transmission unit transmits the information image by transmitting the mail generated by the mail generating unit to the mobile terminal,
    the reception unit receives the information image by receiving the mail transmitted by the transmission unit,
    the acquisition unit acquires the visitor information and the notification destination information by acquiring the information image captured by an image capturing apparatus, and
    the notification unit provides notification that the visitor has arrived by transmitting a visitor information notification mail indicating that the visitor has arrived.

5. The image forming system according to claim 4, wherein
    when transmitting the visitor information notification mail, the notification unit sets therein a destination address for transmission of a mail-opening confirmation mail in advance and transmits the mail, and
    when the information processing apparatus has received the visitor information notification mail, the transmission unit transmits, in response to the visitor information notification mail, a mail-opening confirmation mail or a return mail to the destination address for transmission set in advance, the mail-opening confirmation mail or return mail indicating that the visitor information notification mail has been opened at a destination thereof.

6. The image forming system according to claim 4, wherein
    when transmitting the visitor information notification mail, the notification unit sets therein a destination address for transmission of a mail-opening confirmation mail in advance and transmits the mail, and
    when a given length of time has passed with no mail-opening confirmation mail received since reception of the visitor information notification mail by the information processing apparatus, the transmission unit forwards the visitor information notification mail to a predetermined mail address.

7. The image forming system according to claim 4, wherein the image forming apparatus further comprises an input device that accepts input indicating the visitor information and the notification destination information.

8. The image forming system according to claim 4, further comprising an image capturing apparatus that photographs the visitor, wherein
    the issuance unit issues a permit having an image printed thereon that includes a photograph of the visitor taken by the image capturing apparatus.

9. The image forming system according to claim 4, wherein the issuance unit issues a permit having an image printed thereon in which an image indicating the visitor information is arranged in a predetermined layout.

10. The image forming system according to claim 4, wherein
the information image generating unit generates an information image containing effective period information indicating an effective period of the permit, and
the issuance unit determines not to issue the permit when the effective period information indicates that the effective period has expired.

11. A computer program product comprising a non-transitory computer-readable medium containing an information processing program, the program causing a computer to execute:
acquiring, from a mobile terminal carried by a visitor, visitor information regarding the visitor and notification destination information indicating a destination of notification to a visitor-receiving person who is to receive the visitor;
based on the acquired visitor information, issuing a permit indicating that the visitor is allowed to enter; and
notifying the destination of notification indicated by the acquired notification destination information that the visitor has arrived, wherein
the acquiring includes acquiring the visitor information and the notification destination information via an image capturing apparatus that acquires an encoded information image that contains the visitor information and the notification destination information, and
the issuing includes issuing the permit by printing out an image that includes the visitor information.

* * * * *